United States Patent [19]

Schuler et al.

[11] Patent Number: 4,707,225

[45] Date of Patent: Nov. 17, 1987

[54] FLUID-COOLED CHANNEL CONSTRUCTION

[75] Inventors: Frederick T. Schuler, Chatsworth; Randolph Flores, Simi Valley, both of Calif.

[73] Assignee: Rockwell International Corporation, El Segundo, Calif.

[21] Appl. No.: 816,473

[22] Filed: Jan. 6, 1986

[51] Int. Cl.$^4$ .............................................. C25D 1/02
[52] U.S. Cl. ................................ 204/9; 29/157 C; 204/29; 204/35.1; 204/37.1; 204/38.1; 204/40
[58] Field of Search ............... 204/3, 4, 9, 29, 35.1, 204/37.1, 38.1, 40; 29/157 C

[56] References Cited

U.S. PATENT DOCUMENTS

| | | | |
|---|---|---|---|
| 3,467,583 | 9/1969 | Naimer | 204/9 |
| 3,595,025 | 7/1971 | Stockel | 60/267 |
| 3,690,103 | 9/1972 | Dederra et al. | 60/267 |
| 3,692,637 | 9/1972 | Dederra et al. | 204/9 |
| 3,729,793 | 5/1973 | Schmidt et al. | 29/157 C |
| 3,738,916 | 6/1973 | Butter et al. | 204/9 |
| 3,768,256 | 10/1973 | Butter et al. | 60/260 |
| 3,782,118 | 1/1974 | Butter et al. | 60/260 |
| 3,832,290 | 8/1974 | Fortini | 204/9 |
| 3,835,644 | 9/1974 | Butter et al. | 60/267 |
| 3,897,316 | 7/1975 | Huang | 204/9 |
| 4,028,198 | 6/1977 | Tuscher et al. | 204/9 |
| 4,078,604 | 3/1978 | Christl et al. | 165/133 |
| 4,156,306 | 5/1979 | Seidel et al. | 29/423 |
| 4,530,740 | 7/1985 | Wolf et al. | 204/9 |

*Primary Examiner*—John F. Niebling
*Assistant Examiner*—William T. Leader
*Attorney, Agent, or Firm*—H. Fredrick Hamann; Harry B. Field; David C. Faulkner

[57] ABSTRACT

A corrosion-resistant cooling channel construction for the flow of a corrosive cooling medium therethrough such as may be utilized in a wall of a combustion chamber. The formation of the cooling channel is accomplished by controlled sequential electrodeposition of selected metals onto a wall substrate of the combustion chamber.

10 Claims, 8 Drawing Figures

FLUID-COOLED CHANNEL CONSTRUCTION

BACKGROUND OF THE INVENTION

1. Field of the Invention

This invention relates to the construction of combustion chambers and, in particular, to a construction of longitudinally arranged channels or similar tubular elements forming closed corrosion-resistant channels for transporting a corrosive cooling medium such as in a combustion chamber wall, or the like.

2. Description of the Prior Art

Regenerative cooling in liquid-propellant rocket combustors or combustion chambers is a widely applied method for improving the capability of combustor walls to withstand thermal stress. It also affords greater dynamic strength against the forces arising from the internal pressure of the combustion chamber due to the temperature differences that occur in operation. The regenerative cooling method commonly feeds one or more of the propellant components through channels in the combustion chamber wall for cooling purposes before they are injected into the combustion chamber.

In one known design for regenerative cooling, the wall to be cooled has capillary tubes of varying cross sections. These capillary tubes are dimensioned and arranged symmetrically about the longitudinal axis of the combustion chamber in such a manner that they touch each other laterally along their entire length. In this form of design, an electroplated layer making contact with the radial outer surface lines of the tubes provides the pressure-tight bonding of the tubes. However, undesirable deformations of the tubes when exposed to operational conditions tend to cause irreparable leaks.

Yet another known method for regenerative cooling in rocket combustors incorporates a radially extending inner row and a radially extending outer row of cooling ducts encircling the interior surface of the thrust nozzle of the neck portion, with the ducts extending longitudinally into the convergent and divergent portions. This arrangement, involving two separate rows of ducts, calls for a complex method of construction which in turn lends itself to a greater possibility of structural failure.

Thus, in the past, to overcome the physical and thermal stress associated with regenerative-type fluid-cooled combustion chambers, the number of coolant channels were increased or the thickness of the portions of the combustor walls between the hot-side surface of the combustor and the coolant channels were minimized. Also, combining those two approaches and improving the method of electrodepositing protective coatings on the channel wall surfaces have been tried without complete satisfaction.

OBJECTS OF THE INVENTION

Accordingly, an object of the present invention is to provide a method of forming corrosion-resistant cooling channels in a wall member.

Another object of the invention is to provide a cooling channel construction capable of physically withstanding the flow of corrosive cooling medium therethrough.

Yet another object of the invention is to provide a cooling channel construction characterized by thermal stress avoidance and elimination of porosity or coolant fluid leakage with resulting chamber wall failure and destruction of the combustion chamber.

SUMMARY OF THE INVENTION

The present invention solves the problem of adequately cooling the combustion chamber wall with corrosive cooling media by providing a method of construction with regard to the coolant carrying passages formed within the combustion chamber wall. The combustion chamber walls are formed with longitudinally extending cooling channels in an optimum substrate having a unique arrangement of thin-walled corrosion-resistant layers of electrodeposited nickel and gold metal on the channel wall surfaces. Thereby corrosion-resistant cooling channels in the combustion chamber wall are obtained.

The method for the formation of cooling channels in a wall member, as may be found in a rocket engine, is realized by first electrodepositing a layer of nickel onto the substrate wall. The substrate wall may be copper or an alloy thereof. Open cooling channels are then machined in the wall member. When the wall member is part of a rocket engine combustion chamber and discharge nozzle, the cooling channels would extend longitudinally from the converging portion across the throat portion and diverging portion of the thrust nozzle. The open cooling channels are separated by lands resulting from the machining process. Next, the bottom and side surfaces of the channels and the land surfaces are activated and a gold layer of predetermined thickness electrodeposited thereon. This gold layer is subsequently removed, for example by wet sanding, from the surface area of the lands down to the first nickel coating but retained on the cooling channels bottom and side surfaces.

The open cooling channels having a gold outer coating, as described in more detail below, are filled with a meltable substance such as a wax composite. The meltable substance is made conductive by burnishing or coating the surface with a fine conductive powder such as silver, graphite, copper, or other suitable material immediately prior to initiation of the final nickel electrodeposition process. This final process electrodeposits a nickel layer or layers, depending upon desired thickness, over the land surfaces and the conductively coated wax composite filling the channels. Finally, by melting and flushing the meltable substance, closed corrosion-resistant cooling channels are provided in a wall member such as a combustion chamber wall.

For a better understanding of the invention, its operating advantage and specific objects attained by its use, reference is made to the accompanying drawings in conjunction with a detailed description of the invention.

DESCRIPTION OF THE PREFERRED EMBODIMENT

Figure 1:
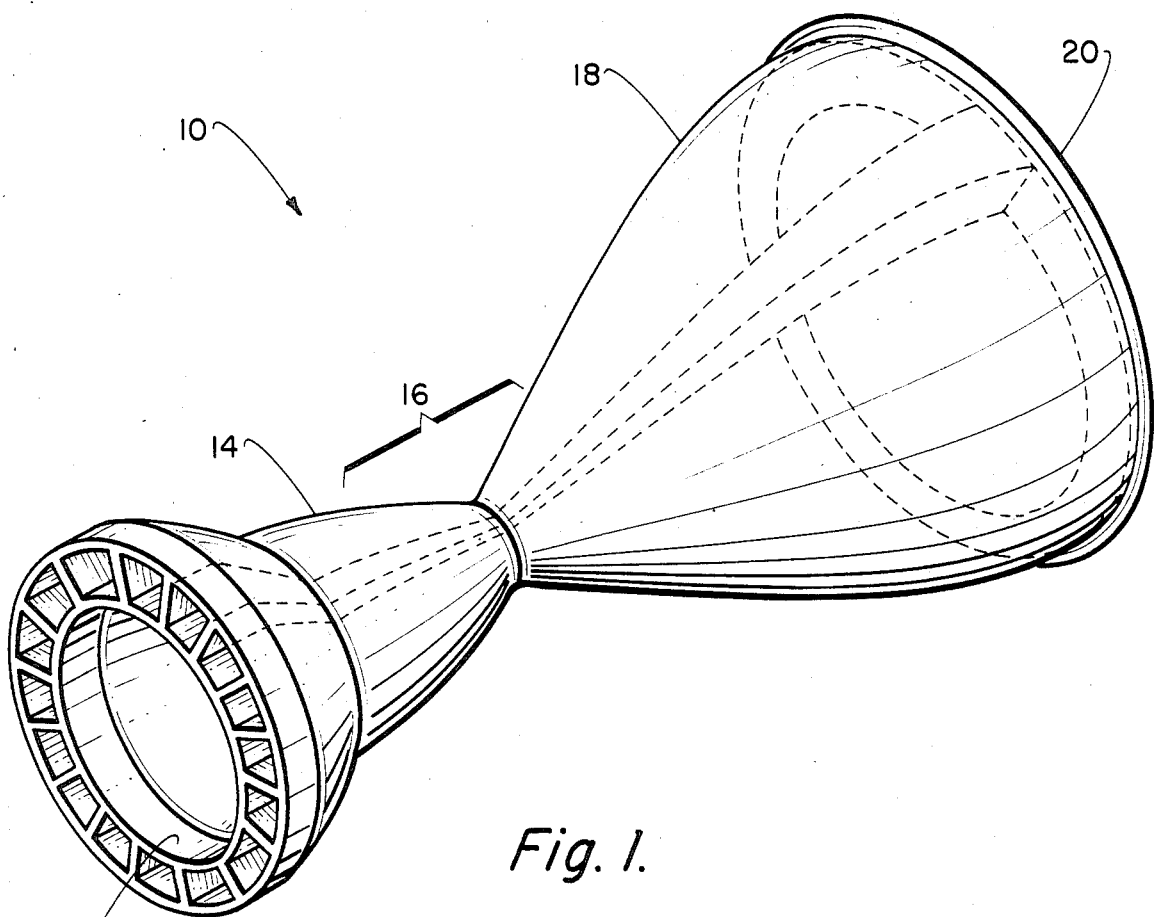
FIG. 1 is an axial sectional view of a combustion chamber having cooling channels constructed in accordance with the invention.

In FIG. 1 is shown a rocket engine thrust generating device 10 having a combustion chamber section 12, a converging section 14, a thrust nozzle section 16, and a diverging section 18 terminating in a thrust gas discharge section 20. By its construction, the thrust generating device is provided with an inner wall 22 or substrate preferably formed of high conductivity copper or copper alloy, having a plurality of cooling channels machined longitudinally therein for the flow of a cooling medium such as nitrogen tetroxide ($N_2O_4$) therethrough. For purposes of illustration only one channel (shown in phantom line) has been depicted.

Figure 2A:
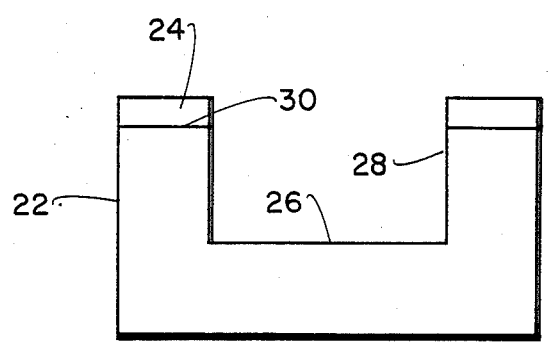
FIGS. 2A–2G depict the step-wise sequential stages in preparing cooling channels according to the present invention.

Referring to FIG. 2A, in addition to FIG. 1, open cooling channels are machined or cut longitudinally into inner wall 22 which has been electrocated with a nickel metal layer or overlay 24 of from about 0.010 inch to about 0.10 inch. Prior to forming the open cooling channels, this nickel overlay is machined to a desired design thickness of from about 0.01 inch along the thrust nozzle and diverging sections 16 and 18 to about 0.065 inch along the converging section 14. The open cooling channels are formed by machining through the nickel overlay and into the copper substrate comprising inner wall 22 to form open channels having a bottom surface 26 and a side wall surface 28 separated by lands 30. While the inner wall or substrate is preferably made of copper as previously noted, it may also be made of a copper alloy, e.g., copper-zirconium, copper-beryllium, copper-silver, or a copper alloy of the "NARLOY" series (trademark of Rockwell International) or any other suitable material, e.g., niobium.

The width to depth ratios of the open channels and width of the lands. 30 between the channels vary. For example, the width and depth of the channels within the converging section will be about 0.063 inch for the width and about 0.125 inch for the depth. Along the throat section the width is about 0.043 inch and the depth is about 0.033 inch. For the diverging section the channel width is about 0.063 inch and a depth of about 0.062 inch. The channel wall angle may vary from about 12° to about 90° with reference to the horizontal bottom surface of the channels. In addition, the width of lands 30 between the channels may vary from about 0.15 inch to about 0.040 inch along the length of the thrust generating device or rocket engine.

Figure 2B:
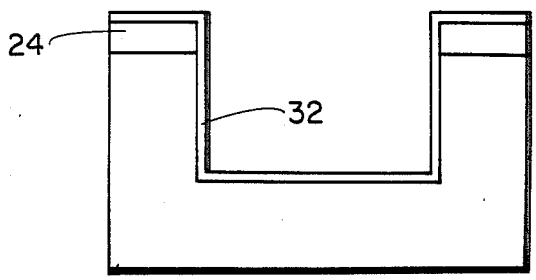
Figure 2C:
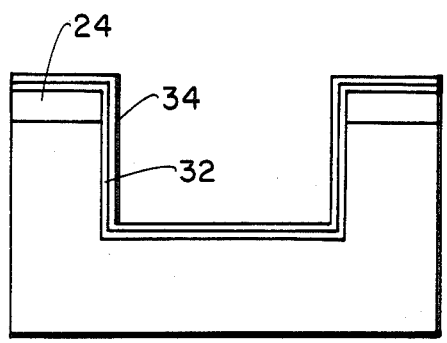
Figure 2D:
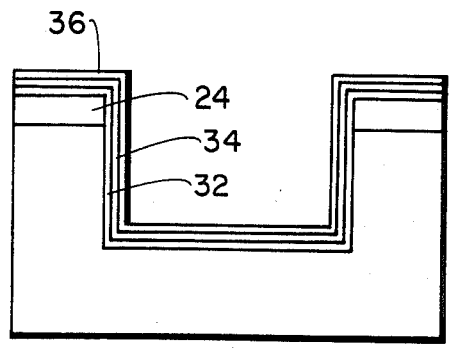

Referring again to FIG. 2A, and also to FIGS. 2B-2G, the construction of the cooling channels is more clearly defined. As noted, in FIG. 2A the substrate or inner wall 22 has a nickel overlay 24 and an open cooling channel machined therein. In FIGS. 2B and 2C, the bottom and side walls and the land surfaces are activated to receive the final protective corrosion-resistant gold layer. The composite activation layer comprises a first nickel layer 32 or strike and a gold overlay 34 or strike. These layers are electrodeposited so as to coat the bottom and side surfaces of the channel and also coat the nickel overlay 24 over the land surface area. This activation layer prepares the copper bottom and side wall surfaces of the cooling channel for the electrodeposition of a protective gold layer 36 (note FIG. 2D) which is electrodeposited over the activation layer. In the activation layer, the nickel strike is from about 0.00001 to about 0.00005 inch thick, the gold strike is also from about 0.00001 to about 0.00005 inch thick, while the protective gold coating or layer 36 is from about 0.0002 to about 0.002 inch thick; all depending in some measure on the channel wall angle and design parameters. More particularly with regard to the gold protective layer, its thickness is determined by the porosity parameters, heat transfer, flow, adhesion or bonding characteristics and especially by the need to protect the physical integrity of the channel against the possible deleterious effects encountered when using a corrosive cooling medium such as nitrogen tetroxide.

Figure 2E:
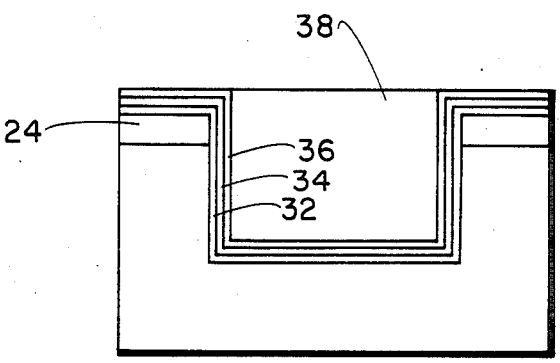

Next, a meltable filler compound 38 is introduced into the channel elements as seen in FIG. 2E. The filler compound is generally a low melting wax or a mixture of an emulsifiable wax and a hydrogenated cyclic hydrocarbon resin, having a melting point of from about 90° C. to about 97° C. Too brittle a wax may result in cracks during use and acid-electrolyte entrapment. This in turn can affect the conductive coating quality. Also, too high a melting point wax presents removal difficulties and too low a melting point wax can result in loss of shape of a deposited metallic layer during the electrodeposition process.

Figure 2F:
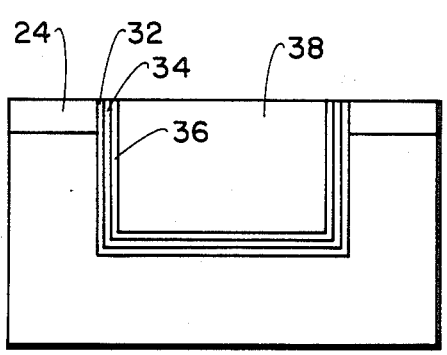
Figure 2G:
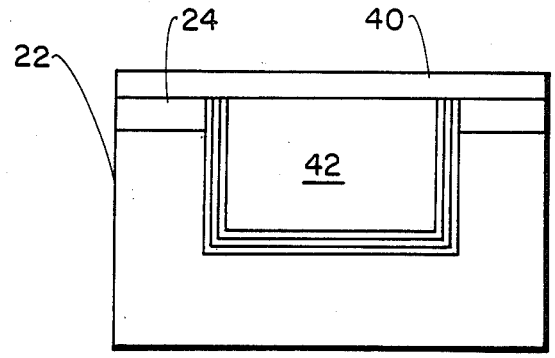

As shown in FIGS. 2E and 2F, the channels are filled with the filler material to the top edge thereof. Next, the lands are wet sanded to remove the activation layers, the protective gold layer and any wax residual. Then, silver powder is burnished into the wax to enhance the next electrodeposition step. Finally, as shown in FIG. 2G, a nickel metal layer or cap 40 of from about 0.018 inch to about 0.5 inch, depending upon design requirements, is electrodeposited over the lands and filler material. Cooling channel formation in wall 22 is completed by heating and flushing the filler material out of the channel, thereby providing a closed cooling channel 42 in the wall member.

The following example and comparison tests will further illustrate the practice of the invention without unduly limiting its scope.

EXAMPLE

An inner wall member 22 consisting of a copper substrate with recessed cooling channels formed therein is produced utilizing the following materials and operating conditions:

PHASE I

An initial cleansing prepares the wall substrate for subsequent processing. This initial cleansing is a vapor degreasing step lasting about 20 minutes utilizing technical grade tetrachloroethylene (perchloroethylene). The wall substrate is then thoroughly flushed with solvent followed by rinsing first, with an alkaline cleaner followed by deionized water. The wall substrate is inspected for any defects deleterious to the electrodeposition operation.

The prepared copper substrate is next coated with a nickel layer or overlay by electrodeposition, which deposited layer is machined until from about 0.01 to about 0.1 inch of nickel uniformly coats the copper substrate wall.

Open cooling channels are then longitudinally formed by cutting through the nickel overlay and into the copper substrate. Channel sizes range from about 0.042 inch wide to about 0.032 inch deep and from about 0.062 inch wide to about 0.120 inch deep with straight sides. The substrate wall is now characterized by longitudinal, open cooling channels, as described, having nickel coated lands separating the channels. These lands vary in width from about 0.15 inch to about 0.040 inch along the length of the wall. The wall is again cleansed by solvent flushing and rinsing with deionized water preparatory to Phase II.

PHASE II

Activation and Gold Coating

The wall substrate prepared according to the steps and conditions of Phase I is now processed to activate or prepare the bottom and side walls of the channels for a bonded protective gold layer. The channels will then be completed in Phase III with the application of a nickel layer over the lands and channels, thereby forming closed cooling channels in the wall substrate.

The wall substrate of Phase I is treated in an Anodic Etch Tank, Cathodic Activate Tank, Nickel Chloride Strike Tank, Gold Strike Tank and Rinse Tanks constituted as follows:

| Anodic Etch Tank | |
|---|---|
| Phosphoric acid | = 71% by wt. (balance distilled water) |
| Temperature | = 44° C. |
| Cathodic Activate Tank | |
| Sulfuric acid | = 40% by wt. (balance distilled water) |
| Temperature | = 39° C. |
| Nickel Chloride Strike Tank | |
| Nickel chloride hexahydrate | = 214 g/l |
| Hydrochloric acid | = 36 g/l |
| Temperature | = 41° C. |
| Anode | = depolarized nickel |
| Gold Strike Tank | |
| Gold | = 0.68 Tr. oz/gal |
| pH | = 0.27 |
| anode | = platinum-coated titanium having a platinum coat of about 1.5$\mu$. |
| Rinse Tanks | |
| Filled with deionized water | |
| Temperature | = 46° C. to 56° C. |
| Conductivity | = 5.0 Micromhos |

Procedurally, the wall substrate of Phase I is affixed to a suitable plating assembly and immersed in a rinse tank of deionized water. The assembly is removed and quickly lowered into the anodic etch using a hot lead. Exposure to the phosphoric acid is for 90 seconds at a current density of 100 A/ft$^2$ (amperes per square foot) followed by continuous rinsing and resubmersion in the first rinse tank water.

The plating assembly is removed from the rinse tank and lowered into the cathodic activate (sulfuric acid) using a hot lead. Exposure is for 300 seconds at a current density of 100 A/ft$^2$ followed by continuous rinsing with submersion in a second rinse tank. Immediately, the assembly is withdrawn from the second rinse tank and conveyed to the nickel strike tank in 30 seconds with continuous rinsing using deionized water. Rinsing is curtailed and the assembly lowered into the nickel strike tank using a hot lead where the assembly remains for 300 seconds at a current density of about 60 A/ft$^2$. A nickel coating having a thickness of about 0.00005 inch is deposited over the lands surfaces and the bottom and side wall surfaces of the channels.

The assembly is removed from the nickel strike tank and transported in 49 seconds with continuous spraying with deionized water to the gold strike tank and submerged therein using a hot lead. The assembly remains in the gold strike tank for 120 seconds at a current density of about 15 A/ft$^2$ resulting in a gold strike layer of about 0.00005 inch.

The final step of Phase II is the deposition of a protective 24-carat gold coating over the gold strike covering the nickel strike. A Gold Electrodeposition System is utilized in which gold as a metal (0.98 Troy oz/gal) is contained in a bath having a pH of 5.5 and a temperature of about 72° C.

The assembly is removed from the gold strike tank, rinsed and lowered into the gold plating solution within the Gold Electrodeposition System. The assembly remains within the plating solution for 7 hours at a current density of 3 A/ft$^2$. Upon removal, a protective 24-carat gold layer about 0.002 inch thick has been deposited over the gold strike layer.

PHASE III

Cooling Channel Closure

Phase III completes the cooling channel construction. The wall substrate prepared in Phase II is now ready for channel closure.

Prior to final nickel deposition using a Nickel Electrodeposition System to form the outer closure layer, a wax filler is applied so as to fill the channels completely. The wall substrate with the wax-filled channels is placed in a clean oven for at least 1 hour at about 67° C. (120° F.) to pre-expand the wax in the channels. After cooling, the land surface areas are wet sanded to remove excess wax, the activation layer and gold protective layer on the lands. Wet sanding is performed while flooding with deionized water (about 41° C. to about 45° C.). After rinsing, the entire wall surface area is then dried with gaseous nitrogen. A conductive coating of silver powder is lightly applied to the filler wax surface by burnishing, covering each channel sequentially. When all of the filler surfaces have been coated satisfactorily, excess silver powder is removed by rinsing the surface with detergent, deionized water, and then drying with gaseous nitrogen.

An activation system is prepared consisting of an Anodic Etch Tank, Cathodic Activate Tank and Rinse Tanks constituted as follows:

| Anodic Etch Tank | |
|---|---|
| Phosphoric acid | = 71% by wt. (balance distilled water) |
| Temperature | = 43° C. |
| Anodic etch current density | = 100 A/ft$^2$ |
| Cathodic Activation Tank | |
| Sulfuric acid | = 41% by wt. (balance distilled water) |
| Temperature | = 40° C. |
| Cathodic current density | = 100 A/ft$^2$ |
| Rinse Tanks | |
| Filled with deionized water | |
| Temperature | = (50° C.-56° C.) |
| Conductivity | = 5.0 micromhos |

The basic procedures of Phase II regarding exposure of the wall substrate to the Anodic Etch Tank, Cathodic Activate Tank and Rinse tanks are followed in Phase III. This prepares the nickel coated land areas and conductive wax filler for the nickel sulfamate deposition process.

A Nickel Electrodeposition System is then prepared in which the electrolyte composition comprises:

| | |
|---|---|
| Nickel, as metal | = 78.0 g/l |
| Boric Acid | = 43.0 g/l |
| pH | = 4.0 |
| Specific gravity | = 1.26 |
| Temperature | = (58° C.) |

The prepared substrate is then introduced into the nickel electrolyte composition using a hot lead. With a deposition rate of about 0.001 inch per hour at about 20 A/ft$^2$, an outer nickel plate of a thickness of from about 0.01 to about 0.5 inch is deposited over the surface of the land surface areas and wax filler.

Subsequently, the outer nickel plate is machined to design requirements, and the wax filler material is removed by melting and flushing from the cooling channels. A wall member having cooling channels closed by an outer nickel plating or cap results.

CHANNEL CONSTRUCTION FLOW TESTS

A full-scale model of a combustion chamber was fabricated from a solid piece of copper. An initial layer of from about 0.010 inch to about 0.015 inch of electrodeposited nickel (EDNi) was deposited prior to final contour machining and slotting of the test sample. Four quadrants of six coolant channels and five inlet channels and a connecting aft manifold were machined in the test sample. This was considered a "minimum" representation of a high pressure pump fed engine (HPPFE) component system combustion chamber for evaluating the electrodeposition parameters/processes and porosity determination. The electrodeposition processes included the plating deposit, tooling and shielding, wax application and close-out of the channels.

An electrochemical porosity determination method was developed and verified on flat, 1.0×4.0 inch copper test coupons, and then confirmed on slotted test panels and the full-scale model test chamber.

Two sets of two test panels, each depicting an array of channel sizes and shapes to be used in the combustion chamber coolant channels protected by nickel or gold were fabricated from copper. For the first set of panels, the specimen for nickel plating had the channels machined without a nickel layer while the specimen for gold plating first had a layer of nickel from about 0.010 inch to about 0.015 inch electrodeposited before channel machining. Channel sizes ranges from 0.042 inch wide by 0.032 inch deep to 0.062 inch wide by 0.120 inch deep with straight sides. Several 12-degree sided channels were fabricated with approximately the same width-to-depth ratios as the straight-sided channels. Planned nickel and gold thickness was 0.001 inch and 0.002 inch, respectively.

Referring to Table 1 below, channel areas no. 1 (0.042 inch wide by 0.030 inch deep), no. 3 (0.062 inch wide by 0.060 inch deep) and no. 6 (0.062 inch wide by 0.120 inch deep) were prepared. These channel configurations closely approximate the channel geometry in the test combustion chamber.

For producing the second set of panels, changes were made in the way the test panels were fabricated. The changes were:

(1) An initial nickel layer (0.010–0.015 inch) was plated prior to machining of the channels for both EDNi (electrodeposited nickel) and EDAu (electrodeposited gold) channel coating evaluation.

(2) The planned thickness of the nickel deposit was increased from 0.001 inch to about 0.002 inch.

(3) Electrolyte flow impingement and panel agitation were employed during deposition of the gold having a planned thickness of 0.002 inch.

Each panel was machined flat and then the channels were machined as indicated. The panels were wax filled, silvered, and closed out with electrodeposited nickel. On the electrodeposited gold coated panels, the gold was sanded off the lands to expose the initial nickel layer prior to silvering of the wax and nickel closeout. This allowed a standard EDNi to EDNi activation for the closeout of both panels. Finally, after closeout and removal of wax and filler, a manifold was attached for flow testing.

The panels were then subjected to a flow test in which hot nitrogen tetroxide was caused to pass through the test panels. The test temperature was about 144° C. for the nitrogen tetroxide (NTO) with a pressure of about 720 psig. A flow rate of from about 0.012 to about 0.025 lb/sec for a duration of about 1 hour was used.

Thermal cycle testing was performed on the coated panels. Each was subjected to 40 and 2,000 cycles from ambient to 420° C. Sections were taken from each sample after the 40 cycles of the 2,000 cycles of testing for metallographic evaluation.

RESULTS OF PRE-NITROGEN TETROXIDE FLOW TESTS

Evaluation of the cross sections from the series of EDNi and EDAu coated test panels showed no anomalies in the electrodeposited coating, i.e., no voids, cracks or delamination (unbonding). Cross sections of both as deposited and post blister test (about 550° C.) were evaluated. The protective coating deposit was uniform, with thinning toward the bottom of the channel and, as expected, at the corners. The channels with the 12-degree sides showed an increase in deposit thickness at the bottom. However, the deposit thickness with the straight sides approach the "throwing power" efficiency for slanted channel walls. For the first set of panels tested, no appreciable differences in throwing power efficiency were evident between the electrodeposited gold or electrodeposited nickel.

Measurements taken from cross sections were used to evaluate the efficiency of the deposit on the surface and the corner of the channels for each of the channel areas. For the planned thickness of 0.001 inch for EDNi and 0.002 inch EDAu, Table 1 summarizes the amount of electrodeposited metal that was actually obtained.

TABLE 1

| | Thickness Measurements (Inches) From Set No. 1 Panels | | | |
|---|---|---|---|---|
| | EDNi | | EDAu | |
| Area No. | Land Surface | Bottom Corner | Land Surface | Bottom Corner |
| 1 (THT) | 0.00075 | 0.00045 | 0.0018 | 0.00053 |
| 2 | 0.00062 | 0.00045 | 0.0017 | 0.00047 |
| 3 (FWD) | 0.00066 | 0.00031 | 0.0014 | 0.0003 |
| 4 | 0.00070 | 0.00049 | 0.0014 | 0.00032 |
| 5 | 0.00071 | 0.00032 | 0.0013 | 0.0003 |
| 6 (AFT) | 0.00073 | 0.00020 | 0.0013 | 0.00022 |
| 7 | 0.00086 | 0.00031 | 0.00145 | 0.00021 |
| 8 | 0.00088 | 0.00054 | 0.0017 | 0.00061 |

Note:
Areas with similar channel geometry to the HPPFE Combustion Chamber are identified as THT = throat: FWD = Forward End: AFT = Skirt below throat.

The second set of panels had twice the planned thickness of nickel coating than the first, 0.002 inch versus 0.001 inch. The projected thickness of gold coating remained the same at 0.002 inch. With flow impingement agitation for deposition of the gold, the throwing power of the gold was shown to be better than that of the nickel. An increase in deposit efficiency for gold from about 23% to about 90% was achieved. Table 2 summarizes the amount of electrodeposited metal that was obtained.

TABLE 2

Thickness Measurements (Inches) From Set No. 2 Panels

| Area No. | EDNi Land Surface | EDNi Bottom Corner | EDAu Land Surface | EDAu Bottom Corner |
|---|---|---|---|---|
| 1 (THT) | 0.00195 | 0.0011 | 0.002 | 0.00195 |
| 2 | 0.0019 | 0.0009 | 0.0021 | 0.00185 |
| 3 (FWD) | 0.0016 | 0.0007 | 0.002 | 0.0016 |
| 4 | 0.00195 | 0.0008 | 0.002 | 0.00185 |
| 5 | 0.0018 | 0.0006 | 0.002 | 0.0017 |
| 6 (AFT) | 0.002 | 0.0005 | 0.0018 | 0.0016 |
| 7 | 0.002 | 0.0007 | 0.002 | 0.0018 |
| 8 | 0.002 | 0.0014 | 0.0022 | 0.002 |
| AVG. | 0.00194 | 0.0008 | 0.00199 | 0.0018 |

Note:
Area with similar channel geometry to the HPPFE Combustion Chamber are identified as THT = throat: FWD = Forward End: AFT = Skirt below throat.

RESULTS OF NITROGEN TETROXIDE FLOW TESTS

Post nitrogen tetroxide (NTO) flow test examination of the EDNi panels showed extensive erosion of the electrodeposited nickel and corrosion of the copper. Examination of the first electrodeposited gold panels showed minor indication of erosion/corrosion of the copper, although none was detected in the cross sections evaluated. It appears that the nickel deposit contains sufficient porosity to allow the NTO to corrode the copper beneath the nickel deposit, resulting in subsequent undermining and erosion of the nickel. Metallographic reexamination of the second nickel- and gold-coated panels showed no indication of copper corrosion after flow testing. As discussed in more detail below, porosity tests of the second nickel panel gave some positive indication of porosity. Neither of the gold panels showed any indication of porosity.

RESULTS OF POROSITY DETERMINATION

The potentiometric sweep porosity determinations are depicted in Table 3 below which summarizes the comparative results of the porosity tests for the slotted test panels.

TABLE 3

Porosity Determinations

| | Gold Deposit ($\mu A$) | Nickel Deposit ($\mu A$) |
|---|---|---|
| Flat Test Panels | | |
| Deposit Thickness (in.) | | |
| 0.0002 | <10 | 55 |
| 0.0004 | <10 | 40 |
| 0.0006 | <10 | 60 |
| 0.0008 | <10 | 10 |
| 0.0010 | <10 | 10 |
| 0.0012 | 0 | 10 |
| Slotted Test Panels | | |
| Set No. 1 | | |
| Before NTO Flow | <20 | >1000 |
| After NTO Flow | 450 | Corroded, not tested |
| Set No. 2 | | |
| Before NTO Flow | <7.3 | 78 |
| After NTO Flow | 0 | 29 |
| After 40 Thermal Cycles | 5 | 33 |
| After 2000 Thermal Cycles | <1 | 57 |

Note:
$\mu A$ is Peak Current
*Local visual indication of copper corrosion products.

When porosity testing was performed on the submitted sections of the first set of test panels, the gold-plated sample did not show any porosity except in the area where a hole was drilled or international scratches were made. The nickel-plated sample was completely porous and did not show any signs of protection at all. On the post NTO flow tested panels, the gold-coated test panel contained some minor indications of copper corrosion products resulting in porosity being detected. The nickel-coated test panel showed no protective coating as the panel started to corrode during the porosity determination.

On the second set of test panels, the gold-coated test sample showed no indications of porosity other than background current indications, whereas the nickel-coated test panels did indicate porosity. The thickness ranges of the nickel coating in the corners of the slotted panels were from about 0.0005 inch to about 0.0014 inch which correlated to the earlier testing of porosity on flat copper test panels. On the post NTO flow tested panels, the gold-coated panel did not show any porosity while the nickel-coated panel again showed porosity.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

What is claimed:

1. A method of forming corrosion-resistant cooling channels in a wall member for the flow of a corrosive cooling medium therethrough comprising the sequential steps of:
    coating the outer surface of a wall member with a first metallic layer to form a wall substrate having a metallic coating overlay;
    machining said first metallic layer to a predetermined thickness;
    forming open channels having bottom and side wall surfaces through said overlay and into said substrate such that said channels are separated by lands;
    activating said channels bottom, side wall surfaces and land surfaces by the electrodeposition thereon of a second metallic layer of a thickness less than said first metallic layer and a third metallic layer over said second metallic layer of a thickness less than said first metallic layer;
    electrodepositing onto the thus activated channels bottom, side wall surfaces and lands surfaces a fourth metallic layer at least as thick as said first metallic layer;
    filling said open channels with a meltable substance having a melting temperature less than that of said substrate and said metallic layers;
    removing from said lands surface area said second, third and fourth metallic layers to expose said first metallic layer;
    burnishing into said meltable substance a conductive metallic material;
    depositing a final outer metallic layer over said coated substrate and said meltable substance;
    heating said meltable substance to a temperature sufficient to melt said substance; and causing said substance to flow out of said channels leaving a finished wall member having closed corrosion-resistant cooling channels therein.

2. A method according to claim 1 wherein said wall member is a metallic substance selected from the group consisting of copper and alloys thereof.

3. A method according to claim 2 wherein said first and second metallic layers are nickel, said third and fourth metallic layers are gold, and said final outer metallic layer is nickel.

4. A method according to claim 3 wherein said meltable substance is selected from the group consisting of a wax and a mixture of an emulsifiable wax and a hydrogenated cyclic hydrocarbon resin having a melting point of from about 90° C. to about 97° C.

5. A method according to claim 1 wherein said second metallic layer is nickel.

6. A method according to claim 1 wherein said first metallic layer is nickel.

7. A method according to claim 1 wherein said third metallic layer is gold.

8. A method according to claim 1 wherein said fourth metallic layer is gold.

9. A method according to claim 1 wherein said conductive metallic a material is silver powder.

10. A method according to claim 1 wherein said final outer metallic layer is nickel.

* * * * *